(12) United States Patent
Geay et al.

(10) Patent No.: US 11,518,103 B2
(45) Date of Patent: Dec. 6, 2022

(54) POWDER-BASED ADDITIVE MANUFACTURING UNIT COMPRISING A BLOWER CLEANING DEVICE

(71) Applicant: COMPAGNIE GENERALE DES ETABLISSEMENTS MICHELIN, Clermont-Ferrand (FR)

(72) Inventors: Christian Geay, Clermont-Ferrand (FR); Miguel Torres-Castellano, Clermont-Ferrand (FR); Olivier Lauwers, Clermont-Ferrand (FR); Jeremy Chagnard, Clermont-Ferrand (FR); Alexis Treilhes, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 179 days.

(21) Appl. No.: 16/349,869

(22) PCT Filed: Nov. 9, 2017

(86) PCT No.: PCT/FR2017/053049
§ 371 (c)(1),
(2) Date: May 14, 2019

(87) PCT Pub. No.: WO2018/087474
PCT Pub. Date: May 17, 2018

(65) Prior Publication Data
US 2019/0270249 A1    Sep. 5, 2019

(30) Foreign Application Priority Data
Nov. 14, 2016 (FR) ...................................... 1661003

(51) Int. Cl.
*B29C 64/35* (2017.01)
*B29C 64/153* (2017.01)
(Continued)

(52) U.S. Cl.
CPC ................ *B29C 64/35* (2017.08); *B08B 5/02* (2013.01); *B22F 12/00* (2021.01); *B29C 64/153* (2017.08);
(Continued)

(58) Field of Classification Search
CPC ..... B29C 64/35; B29C 64/214; B29C 64/245; B22F 12/30; B22F 12/37; B22F 12/48;
(Continued)

(56) References Cited

U.S. PATENT DOCUMENTS

| 10,343,215 B2 | 7/2019 | Pialot, Jr. et al. |
| 2002/0090410 A1* | 7/2002 | Tochimoto ............ B29C 64/357 425/215 |

(Continued)

FOREIGN PATENT DOCUMENTS

| CN | 104487191 A | 4/2015 |
| CN | 105563825 A | 5/2016 |

(Continued)

OTHER PUBLICATIONS

Patent Translate, "Description DE102014010929A1", May 19, 2021, EPO and Google. (2021) (Year: 2021).*

(Continued)

*Primary Examiner* — Nahida Sultana
*Assistant Examiner* — Margaret B Hayes
(74) *Attorney, Agent, or Firm* — Venable LLP

(57) ABSTRACT

A powder-based additive manufacturing installation (10) comprises a powder layering device (14) that can be displaced along a path linking a start zone (A) and an end zone (B). The layering device (14) comprises powder deposition (Continued)

means (18) for depositing powder in a powder deposition zone (D) situated between the start zone (A) and the end zone (B). The installation comprises a cleaning device (40) situated on the path of the layering device (14). The cleaning device (40) comprises a blowing device (42) configured to blow a gas flow onto at least one surface of the powder deposition means (18).

10 Claims, 5 Drawing Sheets

(51) Int. Cl.
*B08B 5/02* (2006.01)
*B22F 12/00* (2021.01)
*B33Y 10/00* (2015.01)
*B33Y 30/00* (2015.01)
*B33Y 40/00* (2020.01)
*B22F 10/10* (2021.01)

(52) U.S. Cl.
CPC ............ *B22F 10/10* (2021.01); *B33Y 10/00* (2014.12); *B33Y 30/00* (2014.12); *B33Y 40/00* (2014.12); *Y02P 10/25* (2015.11)

(58) Field of Classification Search
CPC .......... B22F 12/47; B22F 12/60; B22F 12/63; B22F 12/67; B22F 12/70; B22F 10/68
See application file for complete search history.

(56) References Cited

U.S. PATENT DOCUMENTS

| | | | |
|---|---|---|---|
| 2004/0003738 A1* | 1/2004 | Imiolek | B33Y 30/00 101/480 |
| 2005/0208168 A1 | 9/2005 | Hickerson et al. | |
| 2007/0179656 A1 | 8/2007 | Eshed et al. | |
| 2009/0145357 A1 | 6/2009 | Kritchman et al. | |
| 2009/0148621 A1 | 6/2009 | Kritchman et al. | |
| 2009/0210084 A1 | 8/2009 | Eshed et al. | |
| 2010/0247742 A1 | 9/2010 | Shi et al. | |
| 2011/0118864 A1 | 5/2011 | Kritchman et al. | |
| 2012/0316669 A1 | 12/2012 | Kritchman et al. | |
| 2013/0000553 A1 | 1/2013 | Hoechsmann et al. | |
| 2013/0193620 A1 | 8/2013 | Mironets et al. | |
| 2013/0297063 A1 | 11/2013 | Kritchman et al. | |
| 2014/0363585 A1 | 12/2014 | Pialot et al. | |
| 2015/0139849 A1 | 5/2015 | Pialot, Jr. et al. | |
| 2015/0258744 A1* | 9/2015 | Muller | B33Y 10/00 264/37.29 |
| 2016/0067781 A1* | 3/2016 | Kawada | B22F 10/70 425/78 |
| 2016/0067929 A1* | 3/2016 | Park | B22F 3/18 425/162 |
| 2016/0221269 A1* | 8/2016 | Okamoto | B33Y 10/00 |
| 2017/0106602 A1 | 4/2017 | Kritchman et al. | |
| 2017/0144374 A1 | 5/2017 | Ono | |
| 2017/0246808 A1* | 8/2017 | Höchsmann | B29C 64/35 |
| 2017/0334131 A1 | 11/2017 | Kritchman et al. | |
| 2018/0043615 A1 | 2/2018 | Hochsmann et al. | |
| 2018/0079137 A1 | 3/2018 | Herzog et al. | |
| 2018/0193887 A1 | 7/2018 | Pourcher et al. | |
| 2018/0207721 A1 | 7/2018 | Schlick et al. | |
| 2018/0215097 A1 | 8/2018 | Pourcher et al. | |
| 2018/0229307 A1 | 8/2018 | Pialot et al. | |
| 2018/0236504 A1 | 8/2018 | Pourcher et al. | |
| 2018/0304301 A1 | 10/2018 | Sachs et al. | |
| 2019/0009334 A1 | 1/2019 | Effernelli et al. | |
| 2019/0366433 A1 | 12/2019 | Aydin et al. | |
| 2020/0215751 A1 | 7/2020 | Barnes et al. | |
| 2020/0406548 A1* | 12/2020 | Yuwaki | B22F 12/20 |
| 2021/0170686 A1 | 6/2021 | Cano et al. | |
| 2021/0178690 A1* | 6/2021 | Driggers | B08B 1/005 |

FOREIGN PATENT DOCUMENTS

| | | | | |
|---|---|---|---|---|
| CN | 10566683 | A | 6/2016 | |
| CN | 105666883 | A | 6/2016 | |
| DE | 102014010929 | A1 * | 1/2016 | ......... B29C 64/153 |
| DE | 102014010929 | A1 | 1/2016 | |
| DE | 102014214943 | A1 | 3/2016 | |
| DE | 102015103726 | A1 | 9/2016 | |
| FR | 2 984 191 | A1 | 6/2013 | |
| JP | 2015-527942 | A | 9/2015 | |
| JP | 2016-55625 | A | 4/2016 | |
| WO | 2016/102970 | A1 | 6/2016 | |
| WO | 2016/177516 | A1 | 11/2016 | |
| WO | 2017/196323 | A1 | 11/2017 | |

OTHER PUBLICATIONS

Co-Pending U.S. Appl. No. 16/349,858, filed Nov. 9, 2017 (available on USPTO system).

International Search Report dated Feb. 6, 2018, in corresponding PCT/FR2017/053049 (6 pages).

* cited by examiner

POWDER-BASED ADDITIVE MANUFACTURING UNIT COMPRISING A BLOWER CLEANING DEVICE

BACKGROUND

The invention relates to the field of powder-based additive manufacturing of a part.

It relates more particularly to a powder-based additive manufacturing installation for a part and a layering device of such an installation.

A powder-based additive manufacturing installation for a part generally comprises a powder layering device that can be displaced along a path linking a start zone and an end zone, provided with powder deposition means capable of depositing powder on a powder deposition zone situated between the start zone and the end zone. These powder deposition means comprise, for example, a hopper, a compartment with removable hatch, or even a dosing cylinder provided with a cavity accommodating a dose of powder.

After its deposition on the deposition zone, the powder is most commonly set in the form of a layer using smoothing means that can form part of the layering device, which preferably comprise a smoothing cylinder. Then, the powder is sintered or melted by an ad hoc device. These operations are repeated as many times as is necessary to form the part.

It is found, because the powder used in the powder-based additive manufacturing installations is both volatile and sticky, that the latter has a tendency to accumulate, then to cluster at various points of the layering device during the powder deposition cycles. In particular, it has been possible to observe that the powder accumulates and forms clusters on some surfaces of the powder deposition means, such as the interstitial zones that are difficult to access between a dosing cylinder and its casing.

Now, on passage of the layering device in the powder deposition zone, the duly formed clusters may happen to drop into the powder deposition zone. This has the effect of modifying the thickness of the layer of powder to be melted relative to the desired thickness and so of reducing the quality of the part being manufactured.

Depending on the granule size analysis of the powder and the thickness required for each deposited layer, the error introduced by the presence of these clusters is more or less tolerable. Thus, when the order of magnitude of the thickness of the layer is of the order of ten or so micrometres, the error introduced becomes so great that it may prove necessary to stop the manufacturing of the part and to scrap it.

The document FR 2 984 191 discloses a powder-based additive manufacturing device. However, this document does not describe any means aiming to avoid the presence of powder clusters in the powder deposition zone.

The aim of the invention is therefore to limit the formation of powder clusters in the layering device of a powder-based additive manufacturing installation, or at least to limit the risks of the latter being located in the powder deposition zone.

SUMMARY

To this end, the invention relates to a powder-based additive manufacturing installation, comprising a powder layering device that can be displaced along a path linking a start zone and an end zone, the layering device comprising powder deposition means for depositing powder in a powder deposition zone situated between the start zone and the end zone, characterized in that it further comprises a cleaning device situated on the path of the layering device, the cleaning device comprising a blowing device configured to blow a gas flow onto at least one surface of the powder deposition means.

By virtue of the presence of the cleaning device on the path of the deposition device, a significant part of the powder can be removed from the zones of the layering device where it tends to accumulate in the powder deposition cycles. In effect, the gas flow blown by the blowing device makes it possible to reach interstitial zones that are difficult to access between the casing and the powder deposition means and to dislodge the clusters, giving the possibility of discharging them before they reach the powder deposition zone.

Thus, the formation of powder clusters is significantly reduced and the risks of them being located in the powder deposition zone is thus limited.

Advantageously, to discharge the clusters before they reach the powder deposition zone, the cleaning device comprises a powder suction device for discharging the powder sucked by the suction device to a zone of the installation, called dust extraction zone, which is isolated from the powder deposition zone.

Preferably, in order to prevent the powder dislodged by the blowing device from reaching the powder deposition zone, the cleaning device comprises sealing means powder-tightly segregating, i.e. delimiting in powder-tight manner, a cleaning zone where the gas flow is blown onto at least one surface of the powder deposition means with respect to the powder deposition zone.

According to a particular embodiment of the invention, the sealing means comprise a brush provided with bristles that can bend on the passage of the layering device.

Advantageously, to better isolate the cleaning zone from the powder deposition zone, the sealing means comprise two brushes, the cleaning zone being delimited by the two brushes and the blowing device being situated between the two brushes.

According to a particular embodiment of the invention, the bristles of the brush extend in a direction at right angles to the surface of the powder deposition means with which they come into contact.

According to a particular embodiment of the invention, the cleaning device is located upstream of the powder deposition zone, considering the path in the start zone to end zone direction.

According to a particular embodiment of the invention, the blowing device comprises means for orienting the gas flow in a predetermined direction of orientation.

According to a particular embodiment of the invention, the blowing device comprises a blowing nozzle provided with a plurality of orifices that are aligned and directed towards the predetermined direction of orientation.

Preferably, the layering device comprising a casing delimiting a volume in which the powder deposition means are situated, the predetermined direction of orientation is such that the gas flow reaches a surface of the casing facing the powder deposition means in the course of the path of the layering device.

According to a particular embodiment of the invention, the powder deposition means comprising a rotary dosing cylinder provided with at least one powder dosing cavity, the predetermined direction of orientation is such that the gas flow reaches a surface of the dosing cylinder in the course of the path of the layering device.

Advantageously, the layering device further comprising powder smoothing means, for example a smoothing cylinder, the predetermined direction of orientation is such that the gas flow reaches a surface of the powder smoothing means, for example a surface of the smoothing cylinder, in the course of the path of the layering device.

The invention relates also to a powder-based additive manufacturing method by means of a powder-based additive manufacturing installation, comprising a step of cleaning of an element of the manufacturing installation, characterized in that the manufacturing installation is according to the invention and in that, during the cleaning step, the layering device is made to follow a cleaning path on which the cleaning device is located, the cleaning path being reciprocating.

In fact, in order to obtain an effective cleaning, it is preferable for the cleaning device to clean the layering device several times, for example in the course of a reciprocating path.

Advantageously, the suction device exerts its suction function throughout the duration of the cleaning step.

To improve the cleaning of the dosage cylinder, during the cleaning step, the smoothing cylinder is made to rotate.

BRIEF DESCRIPTION OF THE FIGURES

The invention will be better understood on reading the following description of the attached figures, which are provided by way of examples and are in no way limiting, in which.

DETAILED DESCRIPTION

Figure 1:
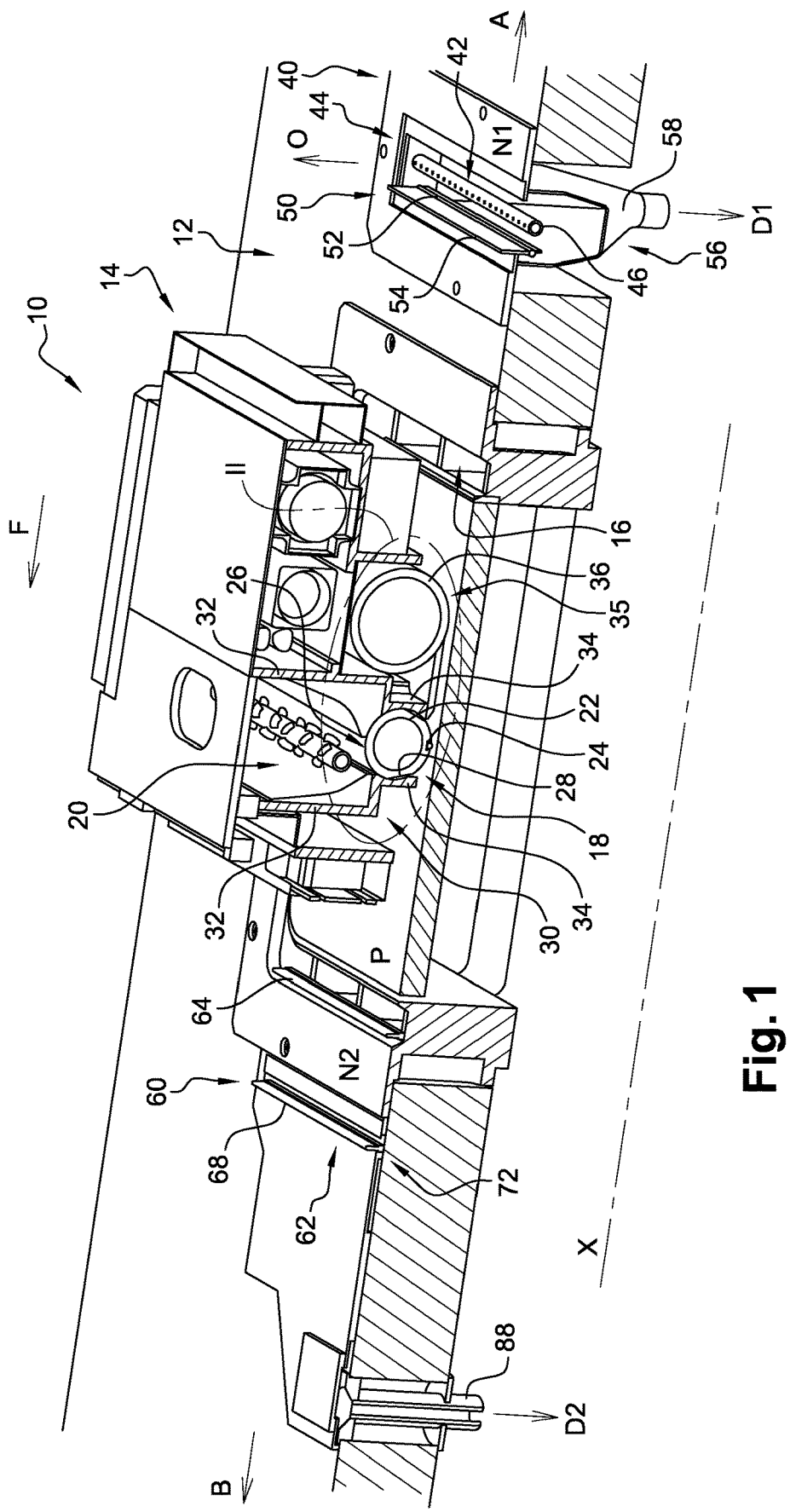
FIG. 1 is a perspective view with a cross section of a powder-based additive manufacturing installation according to a first embodiment of the invention.

FIG. 1 shows a powder-based additive manufacturing installation 10 according to a first embodiment of the invention.

The installation 10 comprises a substantially planar platen 12, over which a layering device 14 can be displaced along a path linking a start zone A of the platen 12 and an end zone B of the platen 12 (for reasons of clarity, the means allowing the displacement and the guiding of the layering device have not been represented in the figures). More particularly, in the embodiments illustrated in the figures, the layering device 14 is displaced by performing a translation along an axis X.

In the course of its path linking a start zone A and an end zone B, the layering device passes over a path powder deposition zone P of the platen 12 (also called working zone), situated between the end zone B and the start zone A and intended to receive a dose of powder delivered by the layering device 14. This dose of powder is then intended to be melted or sintered by ad hoc means, for example an energy beam such as a laser beam, which have not been represented in the figures.

The deposition zone P, of substantially rectangular form, has four sides (only three sides are represented in FIG. 1, given the cross section) surrounded by a recovery tank 16, also called ash box. The recovery tank 16 makes it possible to recover any surplus of powder not used for the additive manufacturing, which is pushed therein by a device provided for this purpose such as a scraper or a roller, for example a smoothing roller, as will be seen later.

The layering device 14 comprises, for depositing a dose of powder on the powder deposition zone, powder deposition means 18.

In the first embodiment of the invention illustrated in FIGS. 1 to 7, the powder deposition means 18 comprise storage means comprising a hopper 20, and powder dosing means, comprising a rotary dosing cylinder 22 provided with a powder dosing cavity 24.

Powder stored in the hopper 20 can be transferred to the dosing cavity 24 by gravity through an opening 26 of the hopper. Then, once the layering device 14 is displaced over the deposition zone P, and after a rotation of the dosing cylinder 22, the dose of powder enclosed in the dosing cavity 24 is deposited by gravity on the deposition zone P.

In this first embodiment of the invention, the dosing cylinder 22 further comprises a flat 28 that makes it possible to prevent, in the rotation of the dosing cylinder 22, the dose of powder thus delivered from being packed down by the dosing cylinder 22.

The powder deposition means 18 are situated in a volume delimited by a casing 30. To this end, the casing 30 comprises first lateral walls 32 separating the hopper 20 of the rest of the layering device 14 and delimiting a storage volume of the powder. The casing also comprises second lateral walls 34 delimiting a volume in which the dosing cylinder 22 is contained.

The layering device further comprises means 35 for smoothing the dose of powder delivered by the powder deposition means 18. They comprise, in this first embodiment of the invention, a smoothing cylinder 36.

The function of the smoothing cylinder 36, on its passage over the deposition zone P as the layering device advances, is to distribute and smooth the dose of powder deposited by the powder deposition means 18.

The smoothing cylinder 36 can be fixed or be rotary. In this particular case, the smoothing cylinder 36 is rotary, and its rotation takes place in a direction that is the reverse of the direction of advance of the smoothing cylinder 36 because of the displacement of the layering device 14.

Thus, given the orientation of FIG. 1, the layering device 14 being displaced in the direction of the arrow F (from the start zone on the right of the figure to the end zone on the left of the figure), the smoothing cylinder 36 rotates in the clockwise direction.

It is found, because the powder used in the powder-based additive manufacturing installation is both volatile and sticky, that the latter has a tendency to accumulate, then to cluster at various points of the layering device 14 during powder deposition cycles.

Figure 2:
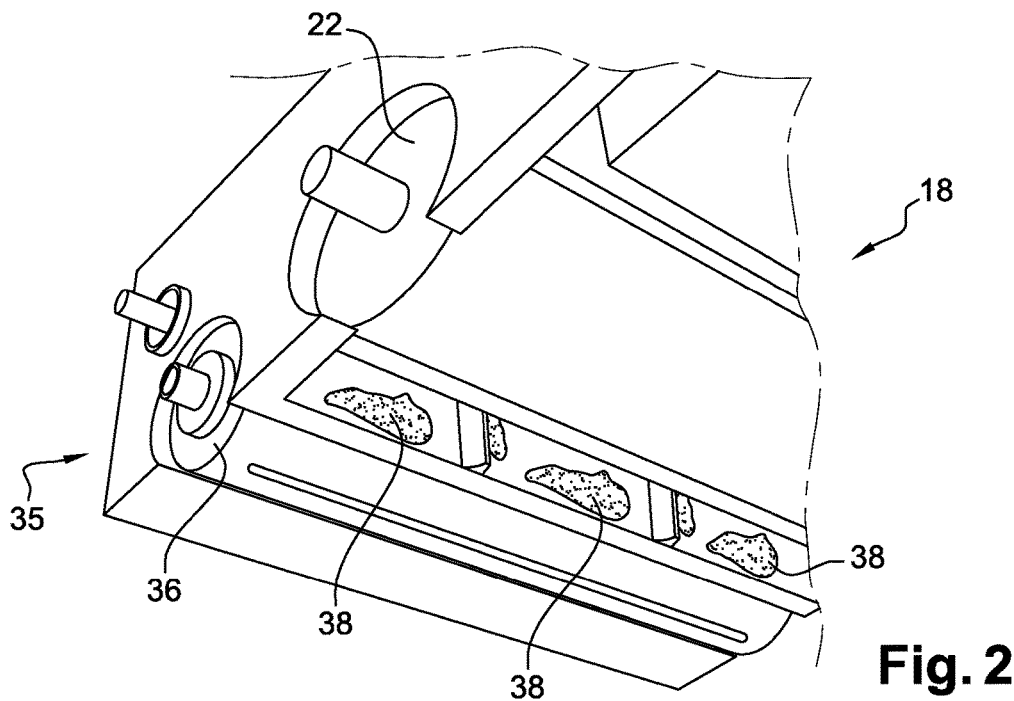
FIG. 2 is a view of the detail II of FIG. 1.

In particular, it has been observed that powder accumulates and forms clusters 38 in the interstices situated between the powder deposition means 18 and the casing 30 of the layering device 14. FIG. 2 illustrates in particular the fact that clusters 38 are formed between the second lateral walls 34 and the dosing cylinder 22.

To remedy this, the installation 10 comprises a first cleaning device 40, situated on the path of the layering device 14 upstream of the deposition zone P, considering the path in the start zone A to end zone B direction.

Figure 3:
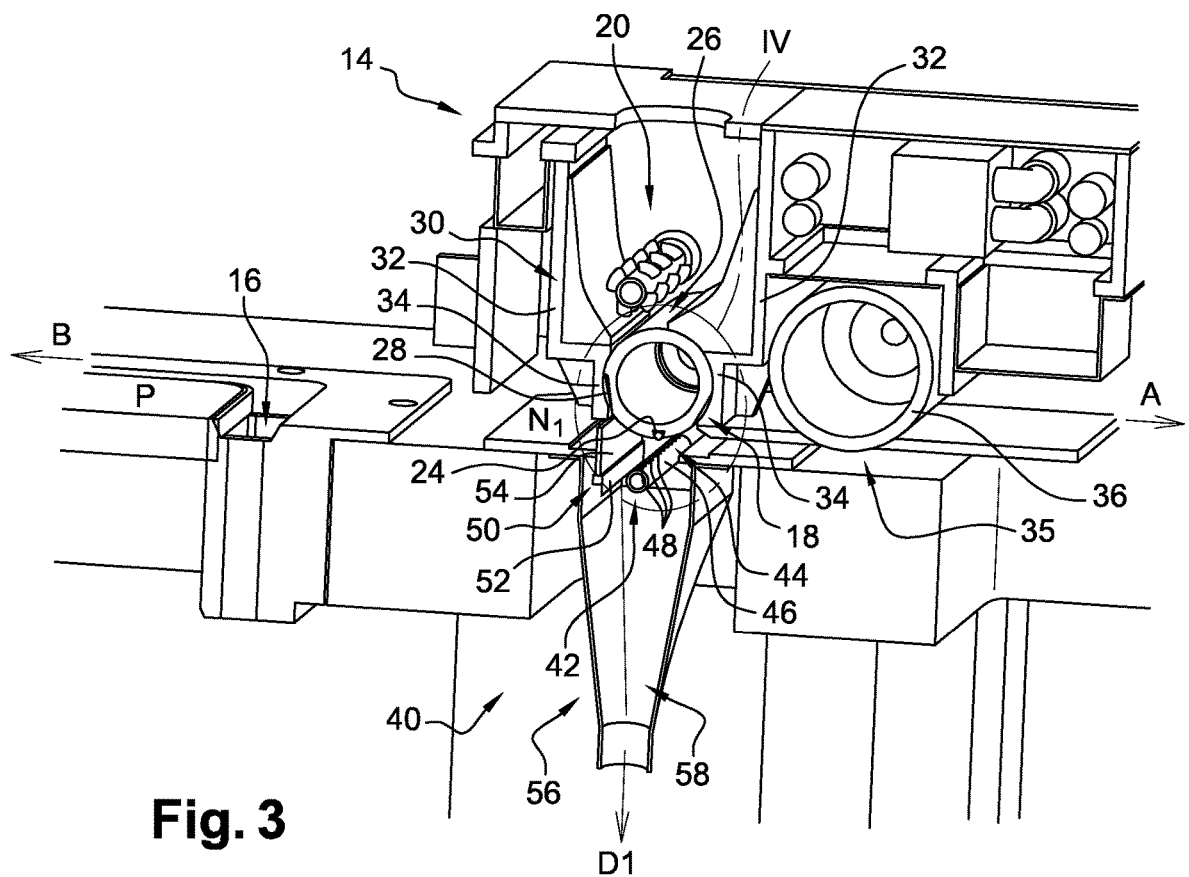
FIG. 3 is a view similar to FIG. 1, in which the layering device is situated in a first cleaning zone.
Figure 4:
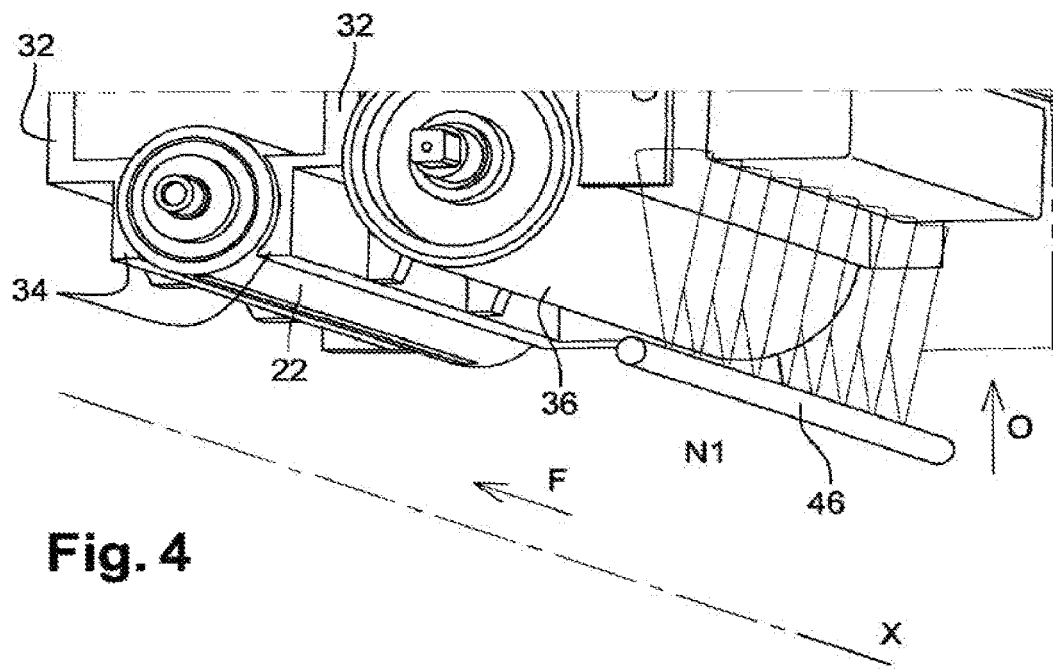
FIG. 4 is a perspective view of a detail IV of FIG. 3.

The first cleaning device 40 comprises a first blowing device 42, visible more particularly in FIGS. 3 and 4, configured to blow a gas flow over at least one surface of the powder deposition means 18. In this particular case, the gas blown by the blowing device is the ambient gas of the deposition zone P, here dinitrogen, but it could also be argon, hydrogen or another neutral gas.

The first blowing device 42 comprises means 44 for orienting the gas flow in a predetermined direction of orientation. More particularly, the orientation means comprise a blowing nozzle 46 provided with a plurality of aligned orifices 48, directed parallel to the predetermined direction of orientation.

The predetermined direction of orientation is chosen such that the gas flow reaches a surface of the casing 30 facing the powder deposition means 18 in the course of the path of the layering device 14.

Preferably, the predetermined direction of orientation is also such that the gas flow reaches, in the course of the path of the layering device 14, a surface of the dosing cylinder 22, as well as a surface of the powder smoothing means 35 such as the surface of the smoothing cylinder 36.

Thus, in the first embodiment represented in FIGS. 1 to 7, the predetermined direction of orientation is chosen as being normal to the plane of the platen 12 and directed towards the layering device 14. This direction of orientation is therefore at right angles to the translation axis X of the layering device 14 and has a direction opposite to the direction in which gravity is exerted.

The choice of such a direction of orientation, represented by the arrows O in FIG. 4, makes it possible to direct the gas flow F from the orifices 48 to the surface of the second lateral walls 34 of the casing 30 situated facing the dosing cylinder 22.

The orifices 48 are preferably aligned in a direction at right angles to the translation axis X of the layering device 14 and to the direction of orientation O. In this way, a gas flow F from the orifices 48 reaches the surface of the dosing cylinder 22 overall, or almost all, the longitudinal direction of the second lateral walls 34 of the casing 30.

This choice also makes it possible to reach the surfaces of the dosing cylinder 22 and of the smoothing cylinder 36 along the path of the layering device 14.

More particularly, the distance that can be reached by the gas flow F will be adjusted, as will be the speed of this flow F, to be able to dislodge the clusters 38 of powder situated between the second lateral walls 34 and the dosing cylinder 22, as can be seen in FIG. 4.

The cleaning device 40 can also comprise sealing means 50 powder-tightly segregating a first cleaning zone N1, where the gas flow is blown onto at least one surface of the powder deposition means 18, with respect to the powder deposition zone P.

Preferably, these sealing means 50 comprise at least one brush 52 provided with bristles 54 that can bend on the passage of the layering device 14. The brush 52 makes it possible to segregate the first cleaning zone N1, in which the first blowing device 42 is located, from the powder deposition zone P.

More particularly, as can be seen in FIG. 3, the length of the bristles 52 of the brush is chosen so as to produce a seal between the cleaning zone N1 and the powder deposition zone P at the time of the passage of the layering device 14 into the first cleaning zone N1. To this end, the bristles 54 of the brush 52 extend in a direction at right angles to the surface of the powder deposition means 18 with which they come into contact. Thus, the bristles extend in the same direction as the direction of orientation O of the flow.

Furthermore, the bristles 52 of the brush are long enough to be flush with one of the second lateral walls 34 of the casing 30 when the blowing nozzle 46 is located in line with the dosing cylinder 22 and thus performs its sealing function.

Because of this, there is also a contact between the bristles 54 and the surface of the dosing cylinder 22 and/or of the smoothing cylinder 36 in the passage of the layering device 14 in the first cleaning zone N1. Thus, in addition to exercising a sealing function, the brush 52 can exercise a function of brushing of the surface of the dosing cylinder 22 and/or of the smoothing cylinder 36 in the passage of the layering device 14. This makes it possible to dislodge therefrom the clusters of powder that have been able to accumulate on the surface of these dosing 22 and smoothing 36 cylinders.

In the embodiment represented in FIGS. 1 to 7, the sealing means 50 comprise only a single brush 52 located downstream of the cleaning zone N1 and of the first blowing device 42. However, in a variant that is not represented, the sealing means 50 comprise two brushes 52, the cleaning zone being delimited by these two brushes 52 and the blowing device 42 being situated between the two brushes 52. The second brush 52 will in this case be preferably identical to the first, and arranged symmetrically relative to the direction of alignment of the orifices 42 (i.e. symmetrically relative to the blowing nozzle 46).

Advantageously, to discharge the clusters 38 dislodged by the first blowing device 42 before they reach the powder deposition zone P, the cleaning device 40 further comprises a first suction device 56. This suction device 56 discharges the powder sucked by this first suction device 56 to a zone of the installation, called first dust extraction zone D1, which is isolated from the powder deposition zone P.

In the first embodiment represented in FIGS. 1 to 7, the first suction device 56 comprises a first discharge duct 58 situated under the first cleaning zone N1, which extends in a direction normal to the plane of the apron 12 and which is directed in a direction opposite to that of the layering device 14.

For reasons of clarity, the elements of the first suction device 56 other than the first discharge duct 58 have not been represented.

Preferably, the first discharge duct 56 is situated in line with the first blowing device 42, and in particular in line with the blowing nozzle 46, therefore below the latter in FIG. 3. For example, the first discharge duct 58 has a convergent form in the direction opposite to the first suction device 56.

Figure 5:
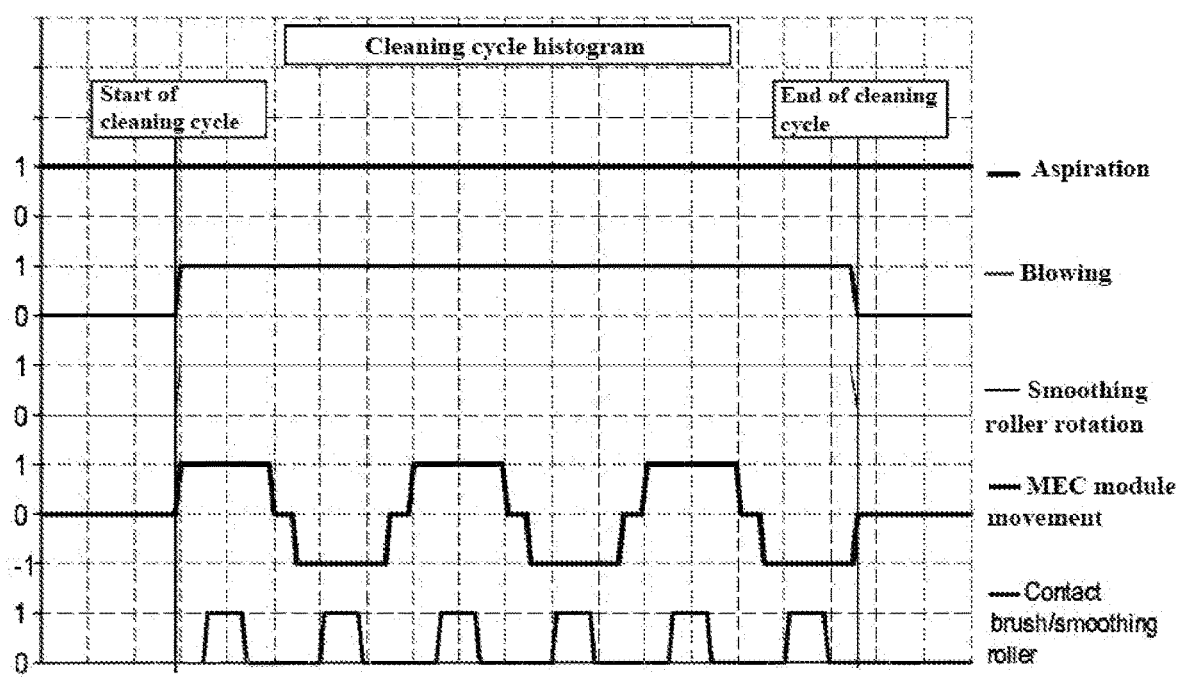
FIG. 5 is a histogram representing the cleaning cycle of the cleaning device of the installation of FIG. 1.

FIG. 5 shows a histogram of a cleaning cycle performed during a manufacturing method according to the invention, comprising a cleaning step.

This manufacturing method comprises a cleaning step during which the layering device 14 follows a cleaning path on which the cleaning device 40 is located, this cleaning path being reciprocating.

For example, as illustrated in FIG. 5 representing a histogram of a cleaning cycle, the layering device 14 performs three round trips on the cleaning path. It will therefore run six times in the cleaning zone N1. On this occasion, there will be six times contact between the brush 52 and the dosing cylinder 22 and the smoothing cylinder 36.

Preferably, the first suction device 56 exercises its suction function throughout the duration of the cleaning step. The same preferably applies for the blowing device 42.

Moreover, still as can be seen in the histogram of FIG. 5, during the cleaning step, the smoothing cylinder 36 is made to rotate, which makes it possible to facilitate the detachment of any clusters 38 of powder by the gas flow F sent by the first blowing device 42. This rotation takes place preferably throughout the duration of the cleaning step.

So as to more specifically dislodge the clusters of powder that can accumulate on the surfaces of the smoothing cylinder 36 and/or of the dosing cylinder 22, the installation 10 comprises a second cleaning device 60, situated downstream of the deposition zone P.

This second cleaning device 60 comprises a brushing device 62 for brushing at least one surface of the powder smoothing means 35, here, that of the smoothing cylinder 36.

To this end, the brushing device 62 comprises at least one brush provided with bristles that can bend on the passage of the layering device 14.

In the embodiment represented in FIGS. 1 to 7, the second cleaning device 60 comprises in particular two parallel brushes extending in a substantially longitudinal direction, an upstream brush 64 and a downstream brush 66 (the terms upstream and downstream having to be understood relative to the path of the layering device 14 from the start zone A to the end zone B).

Figure 6:
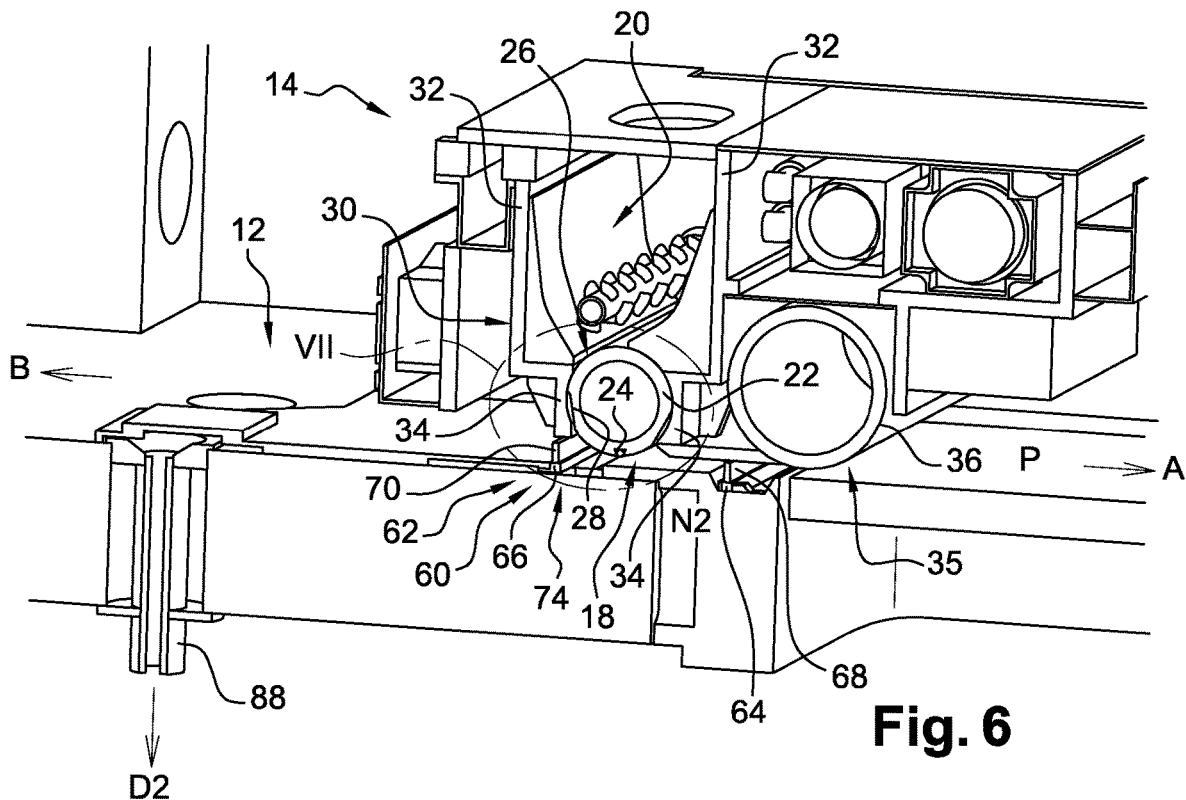
FIG. 6 is a view similar to FIG. 1, the layering device being situated in a second cleaning zone.

In the example represented in FIGS. 1 to 7, and as can be seen in particular in FIG. 6, the upstream brush 64 and the downstream brush 66 are placed such that the layering device 14 is displaced locally in a direction substantially at right angles to the longitudinal direction of the brushes 64, 66.

In this particular case, the upstream brush 64 and the downstream brush 66 extend along an axis at right angles to the direction of translation X of the layering device 14.

Moreover, the bristles 68 of the upstream brush 64 and the bristles 70 of the downstream brush 66 extend in a direction at right angles to the surface of the powder smoothing means 35 with which they come into contact, here the smoothing cylinder 36.

The length of the bristles 68 of the upstream brush 64 and of the bristles 70 of the downstream brush 66 are chosen so that the upstream brush 64 and the downstream brush 66 can brush the surface of the smoothing cylinder 36.

Preferably, the brushing device 62, and therefore the upstream 64 and downstream 66 brushes, also brush at least one surface of the powder deposition means 18, here that of the dosing cylinder 22. Moreover, this brushing is advantageously done at right angles to the surface of the dosing cylinder 22.

In the example represented in FIGS. 1 to 7, the bristles 68 of the upstream brush 64 and the bristles 70 of the downstream brush 66 have the same length. However, in a variant that is not represented, the bristles of the two upstream 64 and downstream 66 brushes have different lengths so as to adapt to the dimensions of the dosing cylinder 22 and of the smoothing cylinder 36 when their diameters differ from one another, or so as to adapt to the different heights of the dosing cylinder 22 and of the smoothing cylinder 36 relative to the deposition zone P.

With the second cleaning device 60 being placed downstream of the powder deposition zone P, the upstream brush 64 segregates a second cleaning zone N2, where the brushing of the powder deposition means 18 takes place, from the deposition zone P.

Thus, preferably, the length of the bristles 68 of the upstream brush 64 is chosen so as to produce a seal between the second cleaning zone N2 and the powder deposition zone P at the time of passage of the layering device 14 into the cleaning zone N2.

In this particular case, the bristles 68 of the brush are long enough to be flush with one of the second lateral walls 34 of the casing 30 when the blowing nozzle 46 is located in line with the dosing cylinder 22 and thus produce a powder sealing function, as in the first cleaning device 40.

As in the first cleaning device 40, the second cleaning device 60 can comprise a powder suction device. This second powder suction device 72 discharges the powder that it sucks to a second dust extraction zone D2 isolated from the powder deposition zone P.

To this end, the second suction device 72 comprises a suction nozzle 74 comprising a suction orifice 76 in the form of a slit with substantially rectangular edges formed in the apron 12.

The suction orifice 76 constitutes the inlet of a discharge duct 78 linking the cleaning zone N2 to the second dust extraction zone D2.

Figure 7:
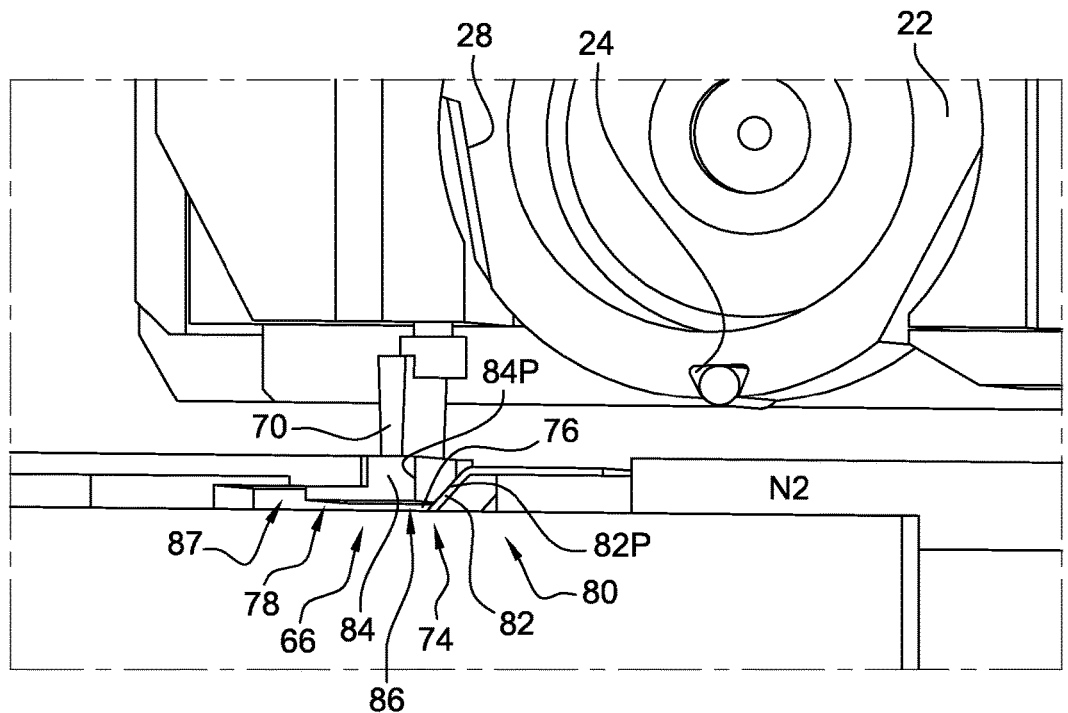
FIG. 7 is a view of a detail VII of FIG. 6.

Preferably, and as can be seen more particularly in FIG. 7, one of the two brushes of the brushing device 62, here the downstream brush 66, is placed at the edge of the suction orifice 76.

To better facilitate the discharging of the powder sucked by the second suction device 72, the latter comprises means 80 for guiding the sucked powder to guide the powder to the second discharge duct 78.

These guiding means 80 comprise in particular a ramp 82 situated facing the downstream brush 66, the wall 82P of the ramp being located opposite a wall 84P of the body 84 of the downstream brush 66 forming a duct 86 for introducing the powder to the rest of the discharge duct 78.

In the example represented in FIGS. 1 to 7, the second discharge duct 78 comprises a first part 87 extending under the apron 12, in a direction parallel to the axis of translation X of the layering device 14.

Then, the second discharge duct 78 comprises a second part composed of a discharge tube 88 extending in a direction normal to the plane of the apron 12. The first end of this tube 88 is linked to the first part 87 and the second end of this tube 88 is linked to the second dust extraction zone D2, in which the sucked powder falls under the effect of the suction and/or of gravity.

In the same way as with the first cleaning device 40, an additive manufacturing method involving the second cleaning device 60 comprises a cleaning step during which the layering device 14 follows a cleaning path on which the second cleaning device 60 is located, the cleaning path being reciprocating. Preferably, during this cleaning step, the smoothing cylinder 36 is made to rotate to better dislodge therefrom any clusters of powder using the upstream 64 and downstream 66 brushes.

It will be noted that, in the first embodiment according to the invention represented in FIGS. 1 and 7, the installation 10 comprises a first cleaning device 40 and a second cleaning device 60, but it can perfectly well comprise only one of the two.

Figure 8:
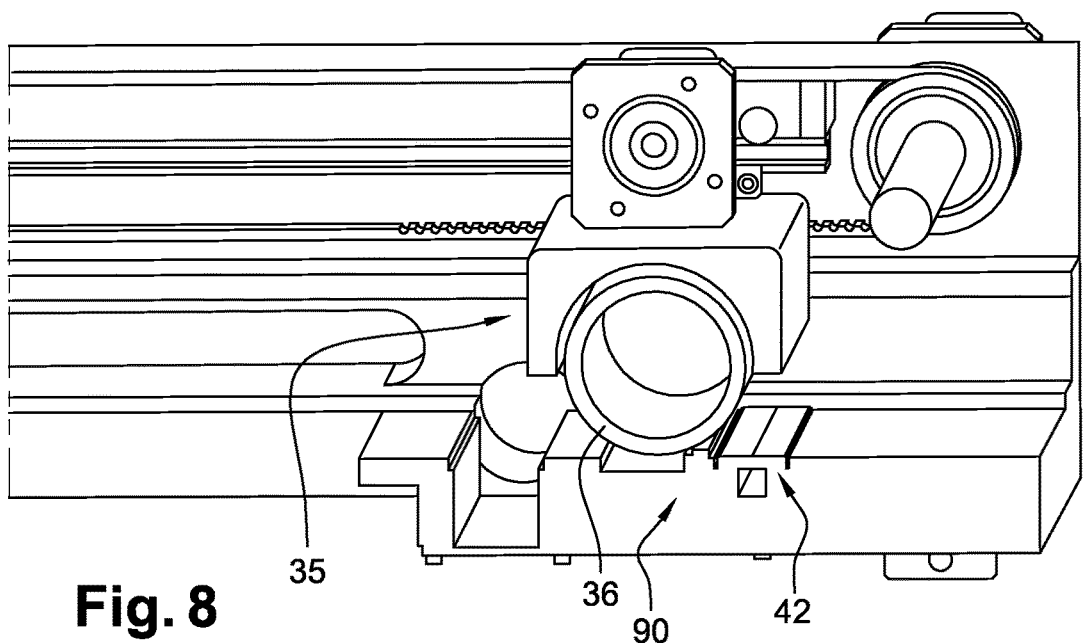
FIG. 8 is a perspective view with a cross section of a powder-based additive manufacturing installation according to a second embodiment that is not claimed.
Figure 9:
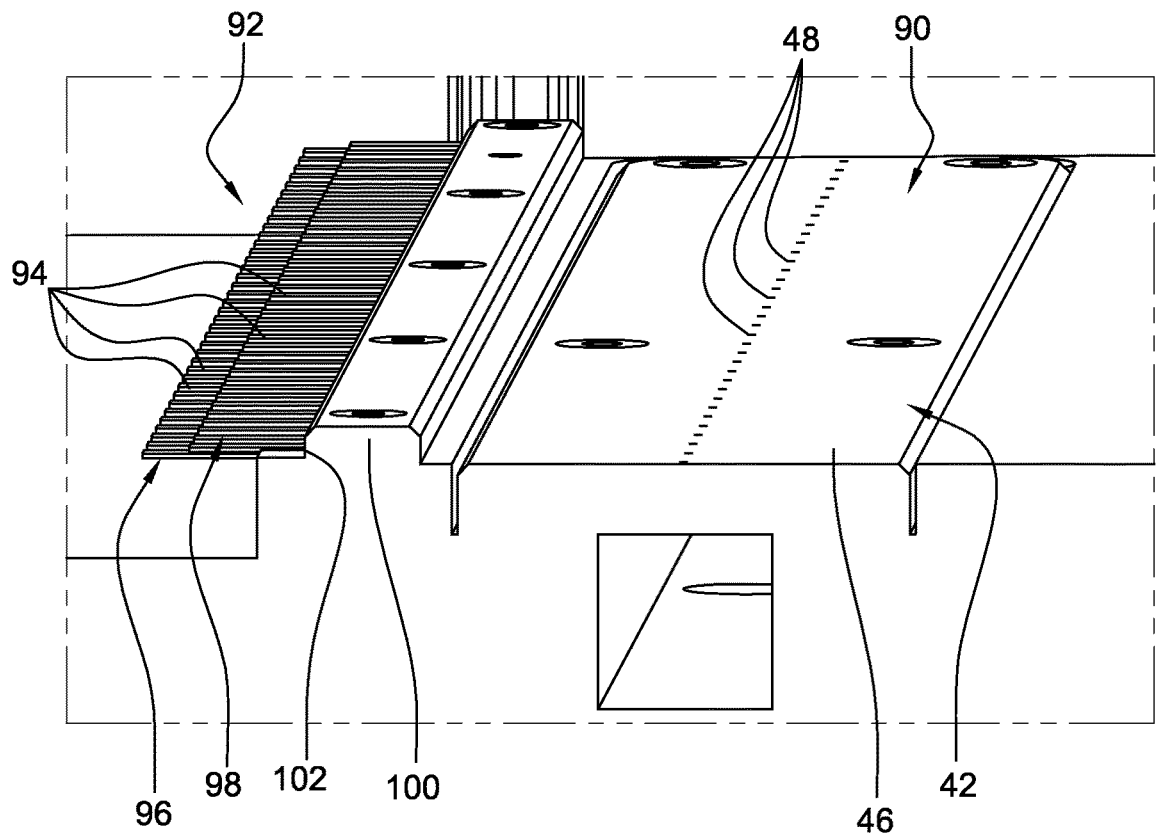
FIG. 9 is a view of the detail IX of FIG. 8.

FIGS. 8 and 9 show a second embodiment of the installation 10 that is not claimed, the elements of which that are common to the preceding embodiment are designated by similar references.

Like the installation of the first embodiment according to the invention, the installation 10 of the second embodiment that is not claimed comprises a powder layering device 14 that can be displaced along a path linking a start zone A and an end zone B.

This layering device 14 comprises powder deposition means 18 for depositing powder in a powder deposition zone P situated between the start zone A and the end zone B.

On the other hand, in this second embodiment that is not claimed, the powder deposition means 18 comprise, instead of a dosing cylinder, a sliding drawer. These deposition means have not been represented in the figures.

Like the first and second cleaning devices, the third cleaning device 90 is situated on the path of the powder deposition device 14 and is provided with means 35 for smoothing the dose of powder delivered by the powder deposition means 18, comprising in particular a smoothing cylinder 36.

The installation 10 of the second embodiment that is not claimed comprises also a cleaning device, or third cleaning device 90, located upstream of the powder deposition zone P.

The third cleaning device 90 comprises scraping means 92 provided with a plurality of longitudinal scraping teeth 94, parallel to one another, that scrape the surface of the smoothing cylinder 36 tangentially to this surface.

In particular, the layering device 14 is displaced locally on the path in a direction substantially parallel to the longitudinal direction of the scraping teeth 94 of the scraping means 92. In the example represented in FIGS. 8 and 9, the scraping teeth 94 of the scraping means 92 therefore extend along the axis X.

Preferably, the scraping means 92 comprise at least one comb comprising the plurality of scraping teeth 94. The scraping teeth 94 of the comb are all substantially of the same length.

In this second embodiment that is not claimed, the scraping means 94 comprise a first comb 96 forming a first row of teeth 94 and a second comb 98 forming a second row of teeth 94, the first and the second rows of teeth 94 being parallel.

In order to obtain a more effective scraping of the surface of the smoothing cylinder 36, the free ends of the teeth 94 of the first comb 96 are offset longitudinally relative to the free ends of the teeth 94 of the second comb 98.

In this particular case, the first comb 96 and the second comb 98 share one and the same body 100. More particularly, the teeth 94 of the first comb 96 and of the second comb 98 extend from one and the same plane, here one and the same surface 102 of the body 100.

Moreover, the length of the teeth 94 of the first comb 96 is greater than the length of the teeth of the second comb 98.

For them to be durable, the teeth 94 of the scraping means 92 are preferably made of metallic material.

More particularly, the teeth of the scraping means 92 are made of demagnetized stainless steel in order, on the one hand, to avoid the creation of oxides and the pollution of the powder by these oxides, and, on the other hand, for them to be able to be used in a metal powder-based additive manufacturing installation. An example of such steel is for example demagnetized stainless steel 301.

In this second embodiment that is not claimed, as in the first embodiment, the cleaning device comprises a blowing device 42 configured to blow a gas flow onto at least one surface of the smoothing cylinder 36.

Since this blowing device 42 is very similar to that of the installation of the first embodiment, it will not be described in more detail here.

It will simply be specified that, in a way similar to the first embodiment, this blowing device 42 comprises a blowing nozzle 46 provided with a plurality of orifices 48 that are aligned and directed towards the surface of the smoothing cylinder 36, and that the layering device 14 is displaced locally on the path in a direction substantially at right angles to the direction of alignment of the orifices 48 of the blowing nozzle 46.

In the same way as with the first cleaning device 40 or the second cleaning device 60, an additive manufacturing method involving the third cleaning device 90 comprises a cleaning step during which the layering device 14 follows a cleaning path on which the third cleaning device 90 is located, the cleaning path being reciprocating.

Preferably, during this cleaning step, the smoothing cylinder 36 is made to rotate to better dislodge therefrom any clusters of powder using the combs 96, 98 in a direction that is the reverse of the direction of advance of the smoothing cylinder 36 by virtue of the displacement of the layering device 14. For example, with the teeth 94 of the scraping means 92 extending from upstream to downstream (from right to left in FIGS. 8 and 9), the layering device 14 is displaced from downstream to upstream and the smoothing cylinder 36 rotates in the anticlockwise direction during the cleaning.

It will be noted that, in the second embodiment that is not claimed represented in FIGS. 8 and 9, the installation 10 comprises a single cleaning device 90, but it can perfectly well comprise several thereof, and in particular one and/or the other of the first 40 and second 60 cleaning devices.

Generally, the invention is not limited to the embodiments presented and other embodiments will become clearly apparent to the person skilled in the art.

It will for example be possible to envisage any combination of elements of the different cleaning devices described above.

The invention claimed is:

1. A powder-based additive manufacturing installation comprising:
   a planar platen;
   a powder layering device that can be displaced over the planar platen along a path linking a start zone (A) of the planar platen and an end zone (B) of the planar platen, the powder layering device comprising powder deposition means for depositing powder in a powder deposition zone (P) situated between the start zone (A) and the end zone (B), and a casing, the casing delimiting a volume in which the powder deposition means is situated; and
   a cleaning device situated on the path of the powder layering device and in the planar platen of the installation, the cleaning device comprising a blowing device configured to blow a gas flow onto at least one surface of the powder deposition means, the gas flow oriented in a predetermined direction of orientation (0) such that the gas flow reaches a surface of the casing, the surface of the casing facing the powder deposition means in the path of the powder layering device,
   wherein the cleaning device is located upstream of the powder deposition zone (P), for a path in a direction from the start zone (A) to the end zone (B),
   wherein the gas flow is adjusted to dislodge a cluster of powder situated in an interstice between the powder deposition means and the casing,
   wherein the cleaning device comprises a sealing means, the sealing means delimiting, in a powder-tight manner, a cleaning zone (N), where the gas flow is blown onto the at least one surface of the powder deposition means, with respect to the powder deposition zone (P), wherein the sealing means comprises a brush provided with bristles that can bend when the powder layering device passes, and wherein the bristles of the brush extend in a direction at right angles to the surface of the powder deposition means with which the bristles come into contact.

2. The powder-based additive manufacturing installation according to claim 1, wherein the cleaning device comprises a powder suction device for discharging the powder sucked by the suction device to a dust extraction zone (D1), which is isolated from the powder deposition zone (P).

3. The powder-based additive manufacturing installation according to claim 1, wherein the sealing means comprises two brushes, the cleaning zone (N) being delimited by the two brushes and the blowing device being situated between the two brushes.

4. The powder-based additive manufacturing installation according to claim 1, wherein the blowing device comprises means for orienting the gas flow in a predetermined direction of orientation (O).

5. The powder-based additive manufacturing installation according to claim 4, wherein the blowing device comprises a blowing nozzle provided with a plurality of orifices that are aligned and directed toward the predetermined direction of orientation (O).

6. The powder-based additive manufacturing installation according to claim 4, wherein the powder deposition means comprises a rotary dosing cylinder provided with at least one powder dosing cavity, and the predetermined direction of orientation (O) is such that the gas flow reaches a surface of the rotary dosing cylinder in the path of the powder layering device.

7. The powder-based additive manufacturing installation according to claim 4, wherein the powder layering device further comprises powder smoothing means, and the predetermined direction of orientation (O) is such that the gas flow reaches a surface of the powder smoothing means in the path of the powder layering device.

8. A powder-based additive manufacturing method using the powder-based additive manufacturing installation according to claim 1, the method comprising the step of:

cleaning an element of the manufacturing installation, wherein, during the cleaning step, the powder layering device is made to follow a cleaning path on which the cleaning device is located, the cleaning path being reciprocating.

9. The method according to claim 8, wherein the cleaning device comprises a powder suction device for discharging the powder sucked by the suction device to a dust extraction zone (D1), which is isolated from the powder deposition zone (P), and wherein the suction device exerts a suction function throughout the duration of the cleaning step.

10. The method according to claim 9, wherein the blowing device comprises means for orienting the gas flow in a predetermined direction of orientation (O), wherein the powder layering device further comprises powder smoothing cylinder, wherein the predetermined direction of orientation (O) is such that the gas flow reaches a surface of the powder smoothing cylinder in the path of the powder layering device, and wherein, during the cleaning step, the powder smoothing cylinder is made to rotate.

\* \* \* \* \*